Nov. 22, 1949  F. G. LAKE ET AL  2,488,730
LAY CONNECTOR
Filed Jan. 15, 1948
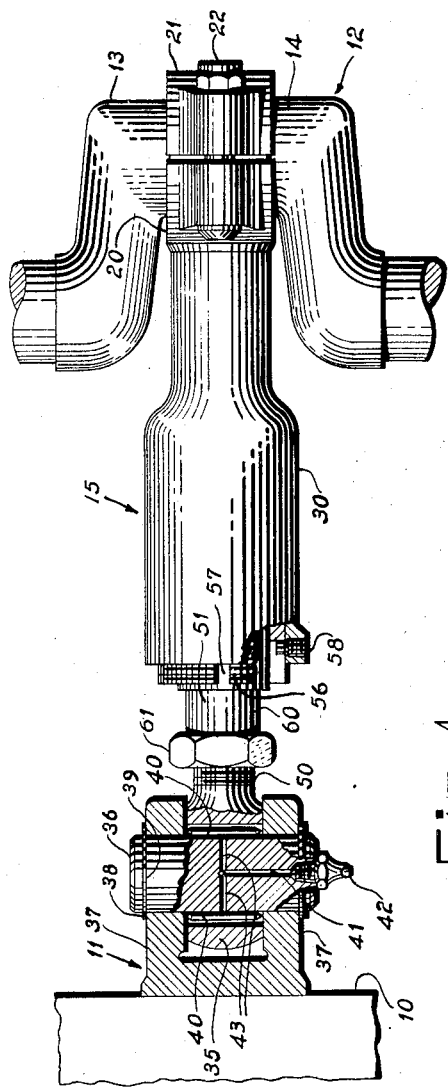
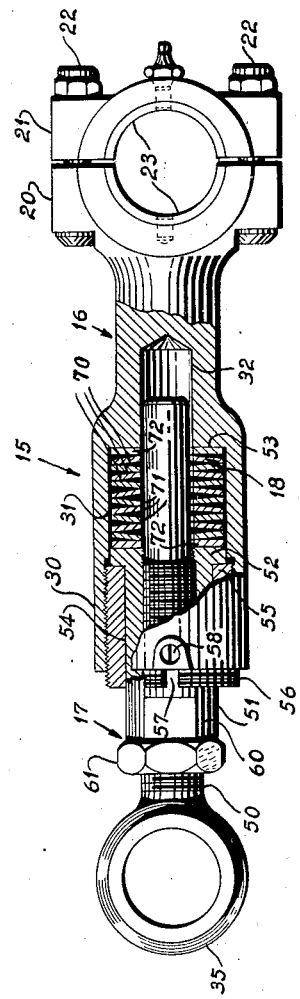
INVENTOR.
FRANCIS GERARD LAKE
JOHN M. COLONAS
BY
Virgil F. Davies
ATTORNEY Patented Nov. 22, 1949

2,488,730

UNITED STATES PATENT OFFICE 2,488,730

LAY CONNECTOR

Francis Gerard Lake, New York, and John M. Colonas, Brooklyn, N. Y., assignors to The M. W. Kellogg Company, Jersey City, N. J., a corporation of Delaware Application January 15, 1948, Serial No. 2,445

5 Claims. (Cl. 139—190)

The present invention relates to improvements in lay connectors for looms.

In the conventional type of loom, the lay is connected to a pair of upright swords, each connected at its lower end to a rocker shaft. The swords are oscillated angularly to cause reciprocation of the lay along the loom. The sword driving means for this purpose comprises a crank shaft or shafts and a lay connector in the form of a connecting rod between said shaft or shafts and each sword.

A resilient lay connector constructed to permit its ends to move relatively towards each other under spring resistance is advantageous, especially for high speed operations, because among other reasons it reduces vibrations and stresses on the loom parts and permits smooth operation with minimum of noise.

Among the objects of the present invention is to provide a new and improved axially resilient lay connector, which affords maximum of compressive spring force in a minimum of space and which has its spring assembly housed and protected against collection of lint or dirt thereon tending to adversely affect its free resilient action.

Various other objects and advantages of the invention are apparent from the following particular description and from an inspection of the accompanying drawings, in which—

Fig. 1 is a top plan view partly in section of the resilient lay connector embodying the present invention and shows said connector attached at its ends to the crank shaft and to the sword, respectively; and Fig. 2 is a side view partly in section of the lay connector.

Referring to the drawings, the loom comprises the usual lay 10 extending across the loom and connected to the upper ends of a pair of upright parallel lay swords 11, only one being shown. The lay swords are located near the loomsides, respectively, and each is secured at its lower end to a rocker shaft (not shown) journalled in suitable bearings on its respective loomside.

The lay swords 11 are angularly oscillated in unison about the axis of their rocker shaft or shafts to bring about reciprocation of the lay 10 along the loom for beat up operations. For so driving these swords, there is provided a single crank shaft 12 for both swords or a pair of axially aligned crank shafts 12 is similar phase position driven in unison. The crank shaft 12 has a double crank 13 with a crank pin 14 for each lay sword 11. A lay connector 15 in the form of a connecting rod is secured at its ends to the crank shaft 12 and to a corresponding lay sword 11, respectively, for oscillating said lay sword from said crank shaft.

The lay connector 15, constituting the subject matter of the present invention, comprises two telescoping parts 16 and 17 connected to the crank shaft and the lay sword, respectively, and a spring assembly 18 between said parts housed in one of said parts. The connector part 16 comprises at one end a bearing 20 and a bearing cap 21 secured to said bearing by bolts 22. The bearing members 20 and 21, internally faced with bearing liners 23, embrace the crank pin 14 with a rotative fit.

The connecting rod part 16 has a tubular end section 30 in which the spring assembly 18 is housed. The tubular end section has an axial cylindrical bore 31 to receive the spring assembly 18 and an axial cylindrical bore 32 of smaller diameter to receive slidably the end section of the connector part 17 for guiding purposes, as will be described more fully.

The connector part 17 comprises a bearing ring 35 at one end encircling a gudgeon pin 36 mounted on the lay sword 11. The lay sword 11 is of U-shaped cross-section presenting side flanges or webs 37 closely confining the bearing ring 35 therebetween; the gudgeon pin 36 passes through said flanges and is retained against axial displacement therein by snap rings 38 held in peripheral grooves 39, respectively, of said pin. A series of needle bearing rollers 40 line the inner periphery of the bearing ring 35 and embrace the periphery of the gudgeon pin 36. An axial lubricant passage 41 in the gudgeon pin 36 is closed at its outer end by a screw fitting 42 to feed lubricant into said passage and connects at its inner end to radial passages 43 in said pin extending to the bearing rollers 40.

The connector part 17 also has a rod-like shank 50 extending into the bore 32 of the connector part 16 with a snug slide fit. Threaded on the connector rod or shank 50 is a sleeve 51 having a cylindrical end flange 52 fitted in the bore 31 of the connector part 16 with a slide fit. The spring assembly 18 is confined in the bore 31 between the flange 52 and the shoulder 53 formed at the base of said bore.

In order to limit the relative outward telescopic movements of the connector parts 16 and 17 and to adjust the initial stress on the spring assembly 18, the sleeve 51 has a cylindrical portion 54 embraced with a snug slide fit by a gland 55 extending into and threaded in the tubular connector section 30. The outer end 56 of the gland 55 projects outwardly beyond the outer end of the tubular connector section 30 to render said gland accessible for turning and is formed at this end with a series of slots 57 extending lengthwise thereof to receive a suitable turning tool such as a spanner wrench. A set screw 58 threaded in the tubular connector section 30 projects into any of the slots 57 on the gland 55 to lock said gland in adjusted position.

The effective length of the connector part 17 may be adjusted by turning the sleeve 51 on the rod or shank 50 to which it is threaded. To facilitate turning manipulation of the sleeve 51, the outer end portion 60 of said sleeve is of the hexagonal or other polygonal form to receive a suitable turning tool such as a wrench. A locking nut 61 threaded on the rod or shank 50 locks the sleeve 51 in adjusted rotative position.

The spring assembly 18 comprises a series of resilient perforated dished discs 70 made of spring metal and arranged in pairs with the concave sides of the discs of each pair facing each other and their outer peripheral circular edges in interengagement. With this arrangement, adjoining discs 70 of adjoining pairs will have their convex sides confronting. The rod or shank 50 passes through the axially aligned performations 71 of the spring discs 70 and through a pair of flat metal washers 72 at the end of the series of spring discs 70.

The spring assembly 18 is maintained under initial compression and exerts an axial force which yieldably resists the telescopic movement of the connector parts 16 and 17 relatively towards each other. The telescopic movements of the connector parts 16 and 17 cause alternate flattening and bowing of the spring discs 70 to thereby afford a resilient connection between the crank shaft 12 and the lay sword 11.

The spring assembly 18 affords high compressive force, although it occupies a comparatively small space. This spring assembly being fully housed, it is protected against lint and other foreign matter.

By turning the gland 55, the initial compressive force on the spring assembly 18 can be adjusted. The set screw 58 locks the gland in adjustive rotative position.

While the invention has been described with particular reference to a specific embodiment, it is to be understood that it is not to be limited thereto, but is to be construed broadly and restricted solely by the scope of the appended claims.

What is claimed is:

1. A rod-like connector for a loom comprising a pair of axially aligned telescoping parts mounted for relative axial movements, the outer telescoping part having at one end bearing means for connection to a crank shaft and having at its other end a tubular section with an axial hollow presenting an axially facing shoulder at its base and an axial bore extending from said hollow but of reduced cross-section, the inner telescoping part having at one end bearing means for connection to a lay sword and an axial shank extending into said hollow and fitted into said bore with a snug slide fit, said inner telescoping part also including a sleeve in said hollow threaded on said shank and having an end flange presenting a surface axially facing said shoulder, said sleeve being rotatable on said shank to adjust the effective length of said inner telescoping part, a gland embracing said sleeve with a slide fit and threaded to said outer telescoping part in its hollow, and a series of axially aligned perforated spring discs in said hollow impaled by said shank and held under compression between said surface and said shoulder, said discs acting to resist relative axial movements of said parts towards each other, said gland engaging said flange and being rotatable to adjust the initial compression of said series of spring discs.

2. A lay connector for a loom, comprising a pair of axially aligned telescoping parts mounted for relative axial movement, the outer telescoping part having a tubular end section with an axial hollow presenting an axially facing shoulder at its base and an axial bore extending from said hollow but of reduced cross-section, the inner telescoping part having an axial rod-like shank extending into said hollow and fitted into said bore with a slide fit, said inner telescoping part carrying a sleeve member embracing said shank and having an end flange defining a surface axially facing said shoulder, a spring assembly in said hollow and around said shank held under compression between said surface and said shoulder and acting to resist relative axial movement of said parts towards each other, and a gland embracing said sleeve member with a slide fit and threaded to said outer telescoping part in its hollow, said gland engaging said flange and serving thereby to adjust the initial compression of said spring assembly.

3. A lay connector for a loom comprising a pair of axially aligned telescoping parts mounted for relative axial movement, the outer telescoping part having a tubular end section with an axial hollow presenting an axially facing shoulder at its base, the inner telescoping part having a bearing at its outer end for connection to a lay sword and an axial shank extension, said inner telescoping part also including a sleeve in said hollow threaded on said shank extension and having a flange presenting a surface axially facing said shoulder, said sleeve being rotatable on said shank extension to permit adjustments in the effective length of said inner telescoping part, a spring assembly in said hollow held under compression between said surface and said shoulder and acting to resist relative axial movement of said parts towards each other, and a gland embracing said sleeve and threaded to said outer telescoping part in its hollow, said gland engaging said flange and serving thereby to adjust the initial compression on said spring assembly.

4. A lay connector for a loom, comprising a pair of axially aligned telescoping parts mounted for relative axial movement, the outer telescoping part having a tubular section with an axial hollow presenting an axially facing shoulder at its base, the inner telescoping part having a bearing at its outer end for connection to a lay sword and an axial shank extension, said inner telescoping part also including a sleeve in said hollow threaded on said shank extension and provided with an end flange presenting a surface axially facing said shoulder, said sleeve being rotatable on said shank extension to permit adjustments in the effective length of said inner telescoping part, a spring assembly in said hollow held under compression between said surface and said shoulder and acting to resist relative axial movement of said parts towards each other, a gland embracing said sleeve with a slide fit and threaded to said outer telescoping part in its hollow, said gland having its inner end engaging said flange and serving thereby to adjust the initial compression of said spring assembly, the outer end of said gland projecting outwardly beyond the end of said tubular section and having a series of slots extending lengthwise thereof to permit the use of a wrench thereon, and a set screw threaded in said tubular section and adapted to fit in any one of said slots to lock said gland in adjusted rotative postition.

5. A lay connector for a loom, comprising a pair of axially aligned telescoping parts mounted for relative axial movement, the outer telescoping part having a tubular end section with an axial hollow presenting an axially facing shoulder at its base and an axial bore extending from said hollow but of reduced cross section, the inner telescoping part having an axial shank extending into said hollow with a slide fit, means carried on said inner telescoping part in said hollow and adjustably positionable along the length thereof presenting a surface axially facing said shoulder, a spring assembly in said hollow and around said shank held under compression between said surface and said shoulder acting to resist relative axial movement of the parts towards each other, and means carried by said outer telescoping part in said hollow and adjustably positionable along the length thereof adapted to engage said first means to limit the movement of said first means in a direction away from said shoulder.

FRANCIS GERARD LAKE.
JOHN M. COLONAS.

REFERENCES CITED

The following references are of record in the file of this patent:

UNITED STATES PATENTS

| Number | Name | Date |
|---|---|---|
| 104,907 | Vose | June 28, 1870 |
| 131,154 | Egan | Sept. 10, 1872 |
| 137,295 | Daniels | Apr. 11, 1873 |
| 443,161 | Devigne et al. | Dec. 23, 1890 |
| 838,162 | Bates | Dec. 11, 1906 |
| 873,606 | Rhoades | Dec. 10, 1907 |
| 1,323,391 | Hillman | Dec. 2, 1919 |
| 1,975,587 | Lewin | Oct. 2, 1934 |